(12) United States Patent
Denkin et al.

(10) Patent No.: US 7,164,527 B2
(45) Date of Patent: Jan. 16, 2007

(54) METHOD, APPARATUS AND SYSTEM FOR CONTROLLING THE EFFECTS OF POWER TRANSIENTS IN OPTICAL TRANSMISSION SYSTEMS

(75) Inventors: Nathan Myron Denkin, Aberdeen, NJ (US); Gerard Lingner, III, Long Branch, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 405 days.

(21) Appl. No.: 10/409,978

(22) Filed: Apr. 9, 2003

(65) Prior Publication Data
US 2004/0091206 A1 May 13, 2004

Related U.S. Application Data

(63) Continuation-in-part of application No. 10/293,754, filed on Nov. 12, 2002, now Pat. No. 6,985,284.

(51) Int. Cl.
*H01S 3/00* (2006.01)

(52) U.S. Cl. .................................. 359/341.43

(58) Field of Classification Search ........... 359/341.43, 359/341.4
See application file for complete search history.

(56) References Cited

U.S. PATENT DOCUMENTS

| 6,441,950 B1 | 8/2002 | Chen et al. ................. 359/334 |
| 6,476,961 B1 * | 11/2002 | Ye et al. ................. 359/341.43 |
| 6,519,081 B1 * | 2/2003 | Lelic et al. ............... 359/341.4 |
| 6,542,287 B1 | 4/2003 | Ye et al. |
| 6,757,099 B1 * | 6/2004 | Pavel et al. .............. 359/341.4 |
| 2002/0114066 A1 | 8/2002 | Nakaji |

OTHER PUBLICATIONS

EPO Search Report published Oct. 13, 2004 for corresponding European Patent Application, EP 1 467 506 A1.

* cited by examiner

*Primary Examiner*—Mark Hellner (57) ABSTRACT

A method, apparatus and system for controlling power transients in amplified optical transmission system includes, in response to the detection of a power transient in an optical signal, varying a gain of at least one amplifier to correct for a time delay in a gain response associated with a gain change in an amplifier. Alternatively, the method, apparatus and system further include in response to the detection of the power transient, adjusting the gain of at least one amplifier to correct for a change in signal power.

26 Claims, 8 Drawing Sheets

METHOD, APPARATUS AND SYSTEM FOR CONTROLLING THE EFFECTS OF POWER TRANSIENTS IN OPTICAL TRANSMISSION SYSTEMS

CROSS-REFERENCE TO RELATED APPLICATIONS

This patent application claims the benefit of U.S. patent application Ser. No. 10/293,754 filed Nov. 12, 2002, which is incorporated herein by reference in its entirety. This patent application is a continuation-in-part of U.S. patent application Ser. No. 10/293,754 filed Nov. 12, 2002 now U.S. Pat. No. 6,985,284.

FIELD OF THE INVENTION

This invention relates to the field of optical communication systems and, more specifically, to Raman-amplified optical transmission systems with transient control capabilities.

BACKGROUND OF THE INVENTION

In optical networks, multiple wavelengths of light are used to support multiple communications channels on a single fiber. Optical amplifier spans are used in such networks to amplify optical signals that have been subject to attenuation over multi-kilometer fiber-optic links. A typical amplifier span may include erbium-doped fiber amplifier components that are pumped with diode lasers. Amplifiers have also been studied that use diode-laser pumping to generate gain through stimulated Raman scattering. Optical amplifiers based on erbium-doped fibers and Raman pumping increase the strength of the optical signals being transmitted over the fiber-optic links.

Sometimes channels in a communications link may be abruptly added or dropped. Channels may be dropped due to an accidental fiber cut. Channels may also be added or dropped suddenly due to a network reconfiguration. When the number of channels carried by a transmission fiber span changes abruptly, the total signal power being transported over the span also changes suddenly. If a Raman amplifier span is pumped at a constant power, these sudden changes in signal power will result in transient effects in the gain of the Raman amplifier. Gain transients cause fluctuations in the power of the output signals from the amplifier. Output signals that are too weak may be difficult to detect without errors. Output signals that are too strong may give rise to nonlinear optical effects in fiber.

SUMMARY OF THE INVENTION

The invention comprises a method, apparatus and system for correcting for the effects of power transients due to the loss or addition of a channel(s) in a Raman-amplified optical transmission system.

In one embodiment of the present invention, a method includes in response to the detection of a power transient in an optical signal in an amplified optical transmission system, varying a gain of at least one amplifier to correct for a time delay in a gain response associated with a gain change in an amplifier. Alternatively, the method further includes, in response to the detection of the power transient, adjusting the gain of at least one amplifier to correct for a change in signal power due to the power transient.

In another embodiment of the present invention, an apparatus includes a memory for storing program instructions and a processor for executing the instructions. The apparatus is adapted to, in response to the detection of a power transient in an optical signal in an amplified optical transmission system, vary a gain of at least one amplifier to correct for a time delay in a gain response associated with a gain change in an amplifier.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and system for controlling the negative effects of power transients in an amplified optical transmission system. Although an embodiment of the present invention will be described within the context of a Raman-amplified optical transmission system comprising specific components, it will be appreciated by those skilled in the art that the method of the present invention can be advantageously implemented in various other amplified optical transmission systems wherein it is desirable to control the negative effects of power transients.

Figure 1:
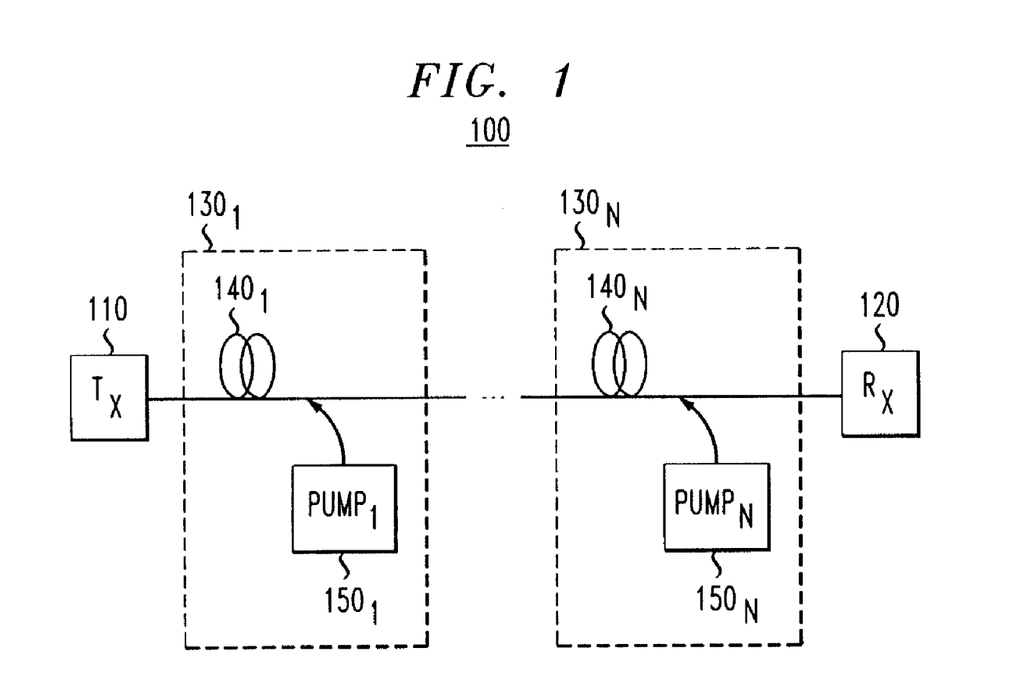
FIG. 1 depicts a high-level block diagram of a conventional Raman-amplified optical transmission system.

FIG. 1 depicts a high-level block diagram of a conventional Raman-amplified optical transmission system. The Raman-amplified optical transmission system 100 of FIG. 1 comprises a transmitter 110, a receiver 120, and a plurality of Raman amplifier spans $130_1$–$130_N$ (collectively Raman amplifier spans 130). Each of the Raman amplifier spans 130 comprises a respective amplification fiber span $140_1$–$140_N$ (collectively fiber spans 140, illustratively standard transmission fiber spans) and a respective pump $150_1$–$150_N$ (collectively pumps 150, illustratively Raman pumps). Each Raman pump 150 may be either a single pump or a plurality of pumps with varied wavelengths acting collectively. The transmitter 110 transmits information to the receiver 120 over the series of Raman amplifier spans 130. Pump light from each of the Raman pumps 150 is transmitted in the backwards direction to pump its respective fiber span 140. Signals in the fiber spans 140 are therefore amplified by Raman gain. Although the amplification fiber spans 140 in the Raman-amplified optical transmission system 100 of FIG. 1 are depicted as comprising standard transmission fibers, it will be appreciated by those skilled in the art that the amplification fiber spans 140 can comprise other amplification mediums such as erbium-doped fiber amplifiers, and the like.

The transmitter 110 may include laser diodes that each supports a channel operating at a different wavelength. As such, if one or more of these lasers is taken out of service or if new channels are added at the transmitter 110, the total number of wavelengths being transmitted across the Raman-amplified optical transmission system 100 may change abruptly. The total number of channels in an optical transmission system may also change due to unexpected system failures such as fiber cuts, or when channels are added or dropped during system reconfigurations using add/drop terminals.

When the total number of channels in the Raman-amplified optical transmission system 100 changes abruptly but the powers of the Raman pumps 150 remains the same, the Raman gain in the fiber spans 140 will also change. Abrupt power changes of this sort may cause unacceptable transients in the power of individual signal channels at the output of each Raman amplifier span 130. For example, if wavelengths (channels) are lost, the input power suddenly decreases because channels have been dropped. If the power of the Raman pumps 150 remains the same, there will be excess gain in each of the pumped fiber spans 140 and the output power per channel at the end of each of the Raman-amplifier spans 130 increases more than desired.

Conversely, when the input power suddenly increases due to the addition of new channels, the Raman pump is depleted more rapidly, which causes the output power per channel at the end of the pumped transmission fiber to decrease more than desired. Because these errors accumulate from Raman amplifier span to Raman amplifier span, the total error of the power for each channel can be calculated by equation (1), which follows:

$$E_t = \sum_{i=1}^{N} E_i \tag{1}$$

wherein $E_i$ represents the error in each amplification span, N stands for the total number of amplification spans, and $E_t$ is the total accumulated error for all of the amplification spans combined.

Figure 2:
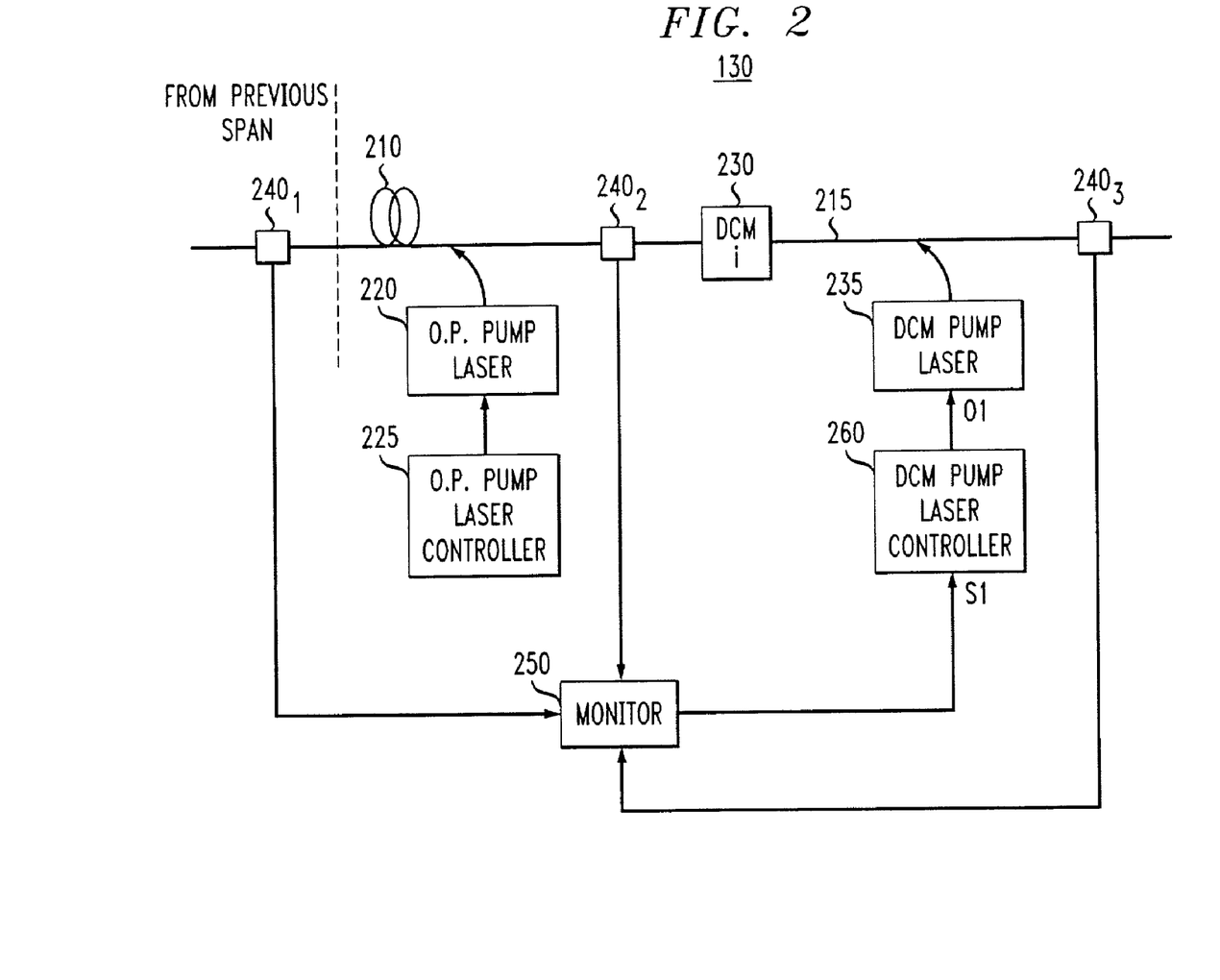
FIG. 2 depicts a high-level block diagram of a single Raman amplifier span of the Raman-amplified optical transmission system of FIG. 1 including an embodiment of the present invention.

FIG. 2 depicts a high-level block diagram of a single Raman amplifier span 130 of the Raman-amplified optical transmission system 100 of FIG. 1, including an embodiment of the present invention. The Raman amplifier span 130 of FIG. 2 comprises an amplification fiber (illustratively a 100 km outside plant fiber (corresponding to the amplification fiber span 140 of FIG. 1)) 210, a transmission fiber 215, a pump (illustratively an outside plant pump laser) 220, a pump controller (illustratively an outside plant pump laser controller) 225, a dispersion compensating module (DCM) 230, a DCM pump laser 235, three taps $240_1$, $240_2$, $240_3$ (collectively taps 240), a monitor 250, and a DCM pump laser controller 260. In the illustrative embodiment of the present invention in FIG. 2, the tap $240_1$, although depicted as being located within the Raman amplifier span 130, is actually located at the end of a directly previous Raman amplifier span and is equivalent to the tap $240_3$ in the illustrated Raman amplifier span 130 of FIG. 2. As such, it should be understood that the tap $240_1$ is being depicted in FIG. 2 for ease of understanding. In the Raman amplifier span 130, the tap $240_1$ is positioned on a transmission fiber prior to the outside plant fiber 210 (i.e., in a previous span). The tap $240_2$ is located after the outside plant fiber 210 and before the DCM 230. The tap $240_3$ is located after the DMC 230.

Figure 3:
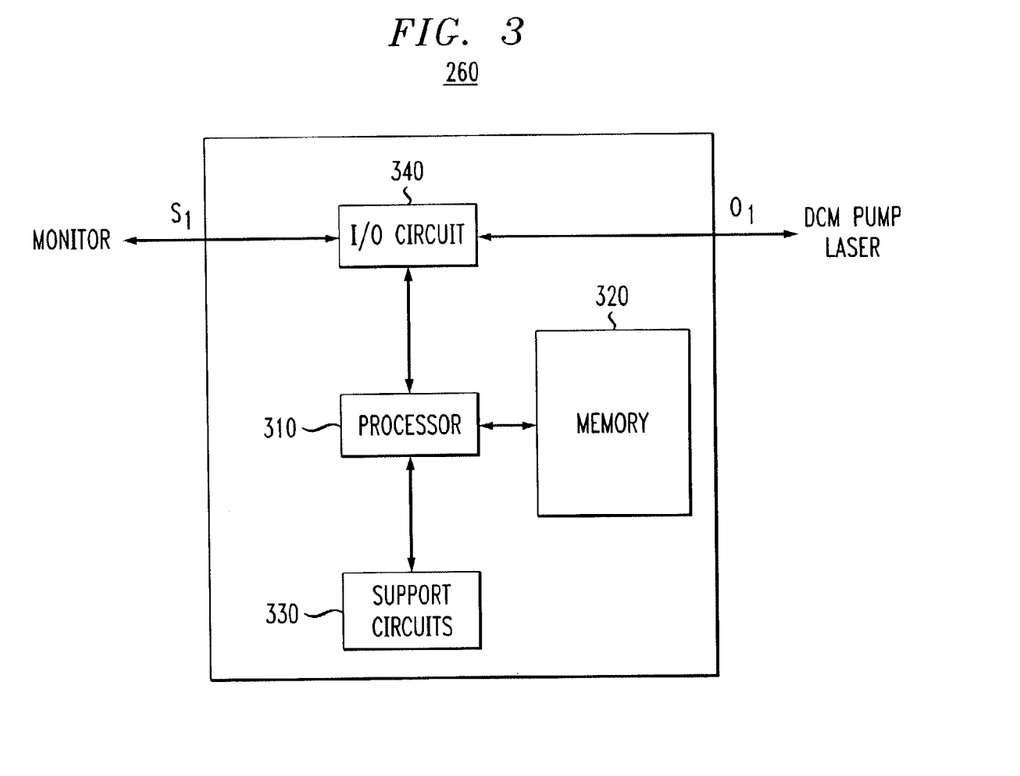
FIG. 3 depicts an embodiment of a DCM pump laser controller suitable for use in the single Raman amplifier span of FIG. 2.

FIG. 3 depicts an embodiment of a DCM pump laser controller 260 suitable for use in the single Raman amplifier span 130 of FIG. 2. The DCM pump laser controller 260 of FIG. 3 comprises a processor 310 as well as a memory 320 for storing the algorithms and control programs. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. DCM pump laser controller 260 also contains input-output circuitry 340 that forms an interface between the various functional elements communicating with the DCM pump laser controller 260. For example, in the embodiment of FIG. 2, the DCM pump laser controller 260 communicates with the monitor 250 via a signal path S1 and to DCM pump laser 235 via signal path O1.

Although the DCM pump laser controller 260 of FIG. 3 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, firmware, hardware, or a combination thereof.

Referring back to FIG. 2, a signal entering the Raman amplifier span 130 was tapped (i.e., in a previous span) by the tap $240_1$. The signal from the tap $240_1$ is communicated to the monitor 250, wherein the power of the incoming signal is measured. The power measurement of the incoming signal is then fed-forward to and recorded in the DCM pump laser controller 260. The signal then propagates through the outside plant fiber 210 wherein the signal is amplified by the outside plant pump laser 220. The signal from the outside plant fiber 210 is tapped by the tap $240_2$. The signal from the tap $240_2$ is communicated to the monitor 250, wherein the power of the signal is measured. The power measurement of the signal is then fed-forward to and recorded in the DCM pump laser controller 260.

The power measurement of the tap $240_1$ (located in the previous span and communicated to this span by conventional means) is compared to the power measurement of the tap $240_2$ in the DCM pump laser controller 260 to determine the gain experienced by the signal in the outside plant fiber 210. The determined gain is compared to an expected amplification gain for the outside plant fiber 210 stored within the DCM pump laser controller 260 to determine a change in the gain of the outside plant fiber 210 (if any)

caused by a loss or addition of a channel(s) in the Raman-amplified optical transmission system 100.

Optionally, the gain change of the outside plant fiber 210 can be determined by measuring the power of the signal entering the DCM 230 (i.e., via the tap 240₂) and comparing the power of the measured input signal to an expected power for a signal entering the DCM 230 stored in the DCM pump laser controller 260. The DCM pump laser controller 260 can then estimate the gain that the input signal would experience in the outside plant 210. The estimated gain is then compared to an expected amplification gain for the outside plant fiber 210 stored within the DCM pump laser controller 260 to determine a change in the gain of the outside plant fiber 210 (if any) caused by a loss or addition of a channel(s) in the Raman-amplified optical transmission system 100.

The gain in the outside plant fiber 210 is determined periodically to check for a gain change. It will be appreciated by those skilled in the art that the time interval for checking for a gain change in the outside plant fiber 210 is system dependent and can be set to any interval desired by a user, within system capabilities.

The signal from the outside plant fiber 210 then propagates through the DCM 230, where it is amplified by the DCM pump laser 260. Any gain change in the DCM 230 caused by the loss or addition of a channel(s) in the Raman-amplified optical transmission system 100 can be estimated by measuring the power of the propagating signal entering the DCM 130 (i.e., via the tap 240₂) and comparing the power of the measured propagating signal to an expected power for an input signal to the DCM 230 stored in the DCM pump laser controller 260. Optionally, the gain of the DCM 230 can be calculated by comparing the power measurement of the tap 240₂ to the power measurement of the tap 240₃ as described below.

After propagating through the DCM 230, the output signal propagates through the transmission fiber 215 and is tapped by the tap 240₃. The signal from the tap 240₃ is communicated to the monitor 250 wherein the power of the output signal is measured. The power measurement of the output signal is then fed-forward to and recorded in the DCM pump laser controller 260. The power measurement of the tap 240₂ is compared to the power measurement of the tap 240₃ to determine the gain experienced by the signal in the DCM 230. The determined amplification gain is compared to an expected amplification gain for the DCM 230 stored within the DCM pump laser controller 260 to calculate a gain change (if any) of the DCM 230 caused by the loss or addition of a channel(s) in the Raman-amplified optical transmission system 100. Additionally, the signal from the tap 240₃ can be used to measure the delay in the DCM 230 for other system implementations that require information regarding the delay of the DCM 230. The transmission fiber 215 is primarily used to couple the output signal from the DCM 230 to an amplification fiber (outside plant fiber) in a next Raman amplifier span.

In accordance with the present invention, the desired result in each Raman amplifier span of the Raman-amplified optical transmission system 100 is that the power of an input signal coming into the span is equal to the power of the output signal exiting the span. That is, the gains and the losses of the particular Raman amplifier span are balanced. The desired result is depicted, implementing the power measurements of the taps 240, in equation (2), which follows:

$$\frac{P(\lambda_i, tap\ 240_3)}{P(\lambda_i, tap\ 240_1)} = 1. \tag{2}$$

Characterizing the above equation as two separate gain components implementing the power measurements of all three of the taps 240 in the Raman amplifier span 130 of FIG. 2, equation (3) and equation (4) are written as follows:

$$\frac{P(\lambda_i, tap\ 240_2)}{P(\lambda_i, tap\ 240_1)} = g_{1i} \tag{3}$$

$$\frac{P(\lambda_i, tap\ 240_3)}{P(\lambda_i, tap\ 240_2)} = g_{2i} \tag{4}$$

wherein $g_{1i}$ represents the gains or losses in the outside plant fiber 210 and $g_{2i}$ represents the gains or losses in the DCM 230. As such, the product of $g_{1i}$ and $g_{2i}$ should equal one ($g_{1i}*g_{2i}=1$) for all wavelengths.

In one embodiment of the present invention, after a change in the gain of the outside plant fiber 210 is detected, an adjustment to the pump power of the outside plant pump laser 220 is made to alter the gain of the outside plant fiber 210 to correct for a gain change in the outside plant fiber 210 due to the loss or addition of channels (transient event) in the Raman-amplified optical transmission system 100. Additionally, an adjustment to the pump power of the DCM pump laser 235 is made to alter the gain in the DCM 230 to correct for a time delay associated with adjusting the pump power of the outside plant pump laser 220 to alter the gain of the outside plant fiber 210 and to correct for a gain change in the DCM 230 due to the loss or addition of channels (transient event) in the Raman-amplified optical transmission system 100. The delay associated with adjusting the power of the outside plant pump laser 220 to alter the gain in the outside plant fiber 210 is attributed to the amount of time that it takes the photons traveling from the outside plant pump laser 220 to propagate through the outside plant fiber 210 before achieving the desired (altered) gain.

Figure 4:
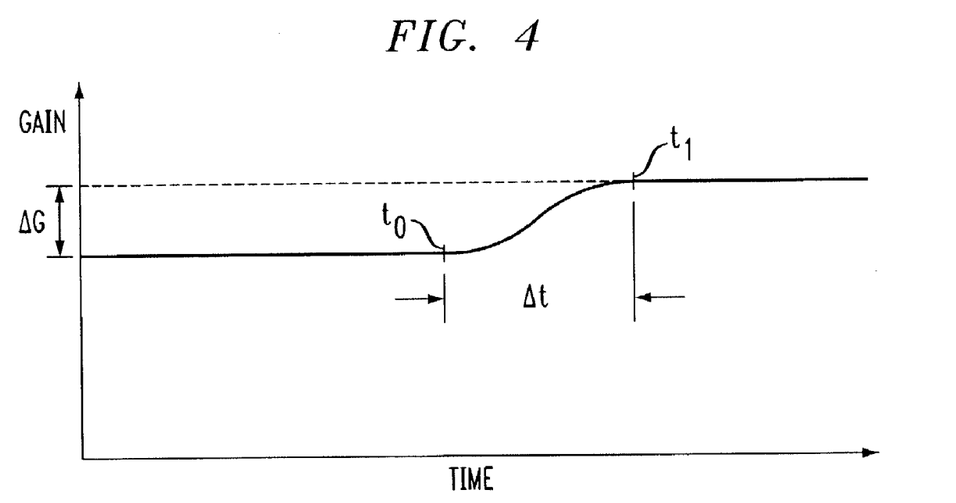
FIG. 4 graphically depicts an exemplary function of a delay associated with a gain change in an amplification fiber resulting from the adjustment of the power of a Raman pump laser.

FIG. 4 graphically depicts an exemplary function of a time delay associated with a gain change in the outside plant fiber 210 resulting from the adjustment of the power of the outside plant pump laser 220. In FIG. 4, $t_0$ depicts the point in time that the outside plant pump laser 220 was adjusted; $t_1$ depicts the point in time that the desired (corrected) gain in the outside plant fiber 210 is achieved; and $\Delta t$ depicts the amount of time between the adjustment of the outside plant pump laser 220 and when the desired gain is achieved in the outside plant fiber 210. A delay time $\Delta t$ is dependent upon the effective length of an amplification fiber and can be calculated from equation (5), which follows:

$$\Delta t = \frac{L_{eff} \times n(\lambda p)}{c} \tag{5}$$

wherein $n(\lambda p)$ is the refractive index of the fiber at the corresponding Raman pump wavelength, c is the speed of light in a vacuum, and $L_{eff}$ is the effective length of the amplification fiber. Equation (5) above is merely a rearrangement of the Rate×Time=Distance formula.

In addition, the effective length $L_{eff}$ of a fiber can be calculated using equation (6), which follows:

$$L_{eff} = \frac{1}{a}[1 - \exp(-aL)]. \quad (6)$$

In equation (6) above, α represents the attenuation of the fiber and L represents the actual length of the fiber.

In the single Raman amplifier span 130 of FIG. 2, a typical communications grade fiber was used (i.e., a SMF, TrueWave, LEAF fiber) as the outside plant fiber 210. The length of the outside plant fiber 210 is typically 100 km and the attenuation for such typical fibers is approximately 0.21 dB/km. Inputting these values for the attenuation and the actual length, respectively, in the equation (6) above, the effective length $L_{eff}$ of the outside plant fiber 210 is calculated as 20 km. Inputting this value for the effective length $L_{eff}$ in the equation (5) above, the delay time $\Delta t_{op}$ for the outside plant fiber 210 is calculated as $10^{-4}$ seconds or 100 μs. The delay time Δtop is calculated by and recorded in the DCM pump laser controller 260.

As such, the gain change in the outside plant fiber 210 due to an adjustment of the pump power of the outside plant pump laser 220 must be considered as a function of time. This change in gain as a function of time (shape from $t_0$ to $t_1$ in FIG. 4) is calculable (as described above) from the determined delay time $\Delta t_{op}$ associated with the outside plant fiber 210 and the determined gain change (described above) in the outside plant fiber 210. This function (shape from $t_0$ to $t_1$) is considered by the inventors as $f_1(t)$. The function $f_1(t)$ is determined by and recorded in the DCM pump laser controller 260. That is, the parameters for the outside plant fiber 210, such as the values for the actual length and attenuation of the outside plant fiber 210, are stored in the DCM pump laser controller 260. Utilizing equations (5) and (6) above, the DCM pump laser controller 260 then calculates the delay time $\Delta t_{op}$ for the outside plant fiber 210. The DCM pump laser controller 260 then awaits for information from the tap 240₂, to determine the amount of gain change in the outside plant fiber 210, to calculate the function $f_1(t)$. The value of the delay function $f_1(t)$ is stored in the DCM pump laser controller 260.

As described above, an adjustment to the pump power of the DCM pump laser 235 is made to change the gain in the DCM 230 to compensate for $f_1(t)$ and to correct for a gain change in the DCM 230 due to the loss or addition of a channel(s) (transient event) in the Raman-amplified optical transmission system 100. As previously disclosed, the gain change in the DCM 230 can be estimated by measuring the power of the propagating signal entering the DCM 130 (i.e, via the tap 240₂) and comparing the power of the measured propagating signal to an expected power for an input signal to the DCM 230 stored in the DCM pump laser controller 260. This gain change in the DCM 230, due to the loss or addition of channels in the Raman-amplified optical transmission system 100, is considered by the inventors as $\Delta g_{2DCM}$.

As such, the DCM pump laser controller 260 needs to calculate a function $f_3(t)$ to correct for $f_1(t)$ and $\Delta g_{2DCM}$, such that $f_3(t)$ is utilized by the DCM pump laser controller 260 to adjust the power of the DCM pump laser 235 to alter the gain in the DCM 230. Similar to the case of the outside plant fiber 210 above, though, adjusting the pump power of the DCM pump laser 235 does not instantaneously change the gain in the DCM 230 to the desired gain. As such, a delay time associated with adjusting the power of the DCM pump laser 235 to alter the gain of the DCM 230 to correct for the gain change $\Delta g_{2DCM}$ in the DCM 230 must also be considered.

A DCM typically has a much shorter fiber length than an amplification fiber in a transmission system. For example, the DCM 230 of FIG. 2 has a much shorter overall actual length than the outside plant fiber 210. The length of the DCM 230 used in the in the Raman amplifier span 130 of FIG. 2 is, in this case 10 km, but varies with the length of the outside plant fiber 210. As such, a delay associated with changing the pump power of the DCM pump laser 235 to compensate for a change in gain in the DCM 230 due to the loss or addition of a channel(s) in the Raman-amplified optical transmission system 100 will be significantly shorter. For example, inputting the actual length L of the DCM 130 into the equation (6) above, the effective length $L_{eff}$ of the DCM 130 is calculated to be 3 km. To calculate for a delay time $\Delta t_{DCM}$ associated with adjusting the pump power of the DCM pump laser 235 to change the gain in the DCM 230, the determined effective length $L_{eff}$ is input into the equation (5) above. Inputting 3 km for the effective length $L_{eff}$ of the DCM 230 in the equation (5) above, the delay time $\Delta t_{DCM}$ associated with adjusting the pump power of the DCM pump laser 235 to change the gain in the DCM 230 is calculated to be 15 μs. Knowing the delay time $\Delta t_{DCM}$ and the amount of gain change $\Delta g_{2DCM}$ in the DCM 230, a delay function is calculated to represent the delay time associated with adjusting the pump power of the DCM pump laser 235 to change the gain in the DCM 230. This function is considered by the inventors as $f_2(t)$. The value of $f_2(t)$ is stored in the DCM pump laser controller 260.

Because $f_1(t)$, $\Delta g_{2DCM}$ and $f_2(t)$ can be modeled based on measurements of a propagating signal taken at the tap 240₁ (from the previous span) and the tap 240₂ and because the signal from the tap 240₂ is fed-forward to the DCM pump laser controller 260, $f_1(t)$, $\Delta g_{2DCM}$ and $f_2(t)$ are determined so the correction can be performed at the DCM 230. That is, there is time for the DCM pump laser controller 260 to determine a function $f_3(t)$ to correct for $f_1(t)$, $\Delta g_{2DCM}$ and $f_2(t)$ because the information from the tap 240₂ is fed-forward to the DCM pump laser controller 260.

Recalling that the product of $g_{1i}$ and $g_{2i}$ should equal one ($g_{1i}*g_{2i}=1$) for all wavelengths, the function $f_3(t)$ is calculated by the DCM pump laser controller 260 using equation (7), as follows:

$$[g_{1i}+f_1(t)][g_{2i}+\Delta g_{2DCM}+f_2(t)+f_3(t)]=1 \quad (7)$$

where $g_{1i}$ and $g_{2i}$ are the original gains of the outside plant fiber 210 and the DCM 230, respectively (before any transient event), $f_1(t)$ is the delay function associated with an adjustment of the power of the outside plant pump laser 220 to alter the gain of the outside plant fiber 210, $\Delta g_{2DCM}$ is the gain change in the DCM 230 due to the loss or addition of a channel(s) (transient event) in the Raman-amplified optical transmission system 100, $f_2(t)$ is the delay function associated with an adjustment of the power of the DCM pump laser 235 to alter the gain of the DCM 230, and $f_3(t)$ is a function to be calculated by the DCM pump laser controller 260 to adjust the power of the DCM pump laser 235 to adjust the gain in the DCM 230 to correct for the functions $f_1(t)$ and $f_2(t)$, and to compensate for the gain change $\Delta g_{2DCM}$ in the DCM 230 due to the loss or addition of a channel(s) in the Raman-amplified optical transmission system 100. Solving for $f_3(t)$:

$$f_3(t) = \frac{1}{g_{1i} + f_1(t)} - g_{2i} - \Delta g_{2DCM} - f_2(t). \quad (8)$$

The function $f_3(t)$ is calculated by the DCM pump laser controller 260 to adjust the pump power of the DCM pump laser 235 to alter the gain in the DCM 230 to compensate for $f_1(t)$ and $f_2(t)$, and to compensate for the gain change $\Delta g_{2DCM}$ in the DCM 230 due to a loss or addition of a channel(s) in the Raman-amplified optical transmission system 100.

Although the single Raman amplifier span 130 of the Raman-amplified optical transmission system 100 of FIG. 1 was depicted as comprising a single amplification fiber, it will be appreciated by those skilled in the art that the methods of the present invention can be implemented in Raman-amplified optical transmission systems comprising amplification spans comprising a plurality of amplification fibers and other amplification mediums in a single span.

In an alternate embodiment of the present invention, a gain change in the outside plant fiber 210 and in the DCM 230 due to the loss or addition of a channel(s) in the Raman-amplified optical transmission system 100 is compensated by adjusting only the pump power of the DCM pump laser 235 to alter the gain in the DCM 230.

As described above for the first embodiment, because adjusting the pump power of the DCM pump laser 235 does not instantaneously change the gain in the DCM 230 to a desired gain, the change in gain in the DCM 230 due to an adjustment of the pump power of the DCM pump laser 235 must again be considered as a function of time. Referring to FIG. 2, because the properties of the DCM 230 do not change, the delay time $\Delta t_{DCM}$ associated with the adjustment of the DCM pump laser 235 to alter the gain in the DCM 230 remains the same (15 µs). Again, a delay associated with adjusting the pump power of the DCM pump laser 235 to alter the gain in the DCM 230 is attributed to the amount of time that it takes the photons traveling from the DCM pump laser 235 to propagate through the DCM 230 before achieving the desired (corrected) gain. Knowing the amount of gain change desired in the DCM 230 to correct for a gain change in the outside plant fiber 210 and the DCM 230 due to a loss or addition of a channel(s) in the Raman-amplified optical transmission system 100, a delay function $f_4(t)$ can be calculated to account for the delay time $\Delta t_{DCM}$ associated with the adjustment of the DCM pump laser 235 to alter the gain in the DCM 230 to correct for a gain change in the outside plant fiber 210 and the DCM 230. Because the signals from the tap 240$_2$ is fed-forward to the DCM pump laser controller 260, the amount of gain change required in the DCM 230 to correct for a gain change in the outside plant fiber 210 and the DCM 230 due to a loss or addition of a channel(s) in the Raman-amplified optical transmission system 100 is known by the DCM 230. As such, the delay function $f_4(t)$ can be modeled based on the measurements of a propagating signal taken at the taps 240$_1$ and 240$_2$ and calculated by the DCM laser controller 260 before the propagating signal reaches the DCM 230.

In addition to correcting for $f_4(t)$, the DCM 230 must also correct for a gain change $\Delta g_{2OP}$ in the outside plant fiber 210 and a gain change $\Delta g_{2DCM}$ in the DCM 230 due to a loss or addition of a channel(s) in the Raman-amplified optical transmission system 100. As such, a function $f_5(t)$ is calculated by the DCM pump laser controller 260 to correct for the delay function $f_4(t)$ and to correct for both, the gain change $\Delta g_{2OP}$ in the outside plant fiber 210 and the gain change $\Delta g_{2DCM}$ in the DCM 230 due to the loss or addition of channels in the Raman-amplified optical transmission system 100. Because $f_5(t)$ can be modeled based on measurements of a propagating signal taken at the taps 240$_1$ (from the previous span) and 240$_2$ and because the signals from the tap 240$_2$ is fed-forward to the DCM pump laser controller 260, the correction function $f_5(t)$ is determined so a correction can be performed at the DCM 230. Recalling that the product of $g_{1i}$ and $g_{2i}$ should equal one ($g_{1i}*g_{2i}=1$) for all wavelengths, the function $f_5(t)$ is determined by the DCM pump laser controller 260 as follows:

$$[g_{1i}+\Delta g_{2OP}][g_{2i}+\Delta g_{2DCM}+f_4(t)+f_5(t)]=1 \quad (9)$$

where $g_{1i}$ and $g_{2i}$ are the original gains of the outside plant fiber 210 and the DCM 230, respectively, $\Delta g_{2OP}$ and $\Delta g_{2DCM}$ are the gain changes in the outside plant fiber 210 and the DCM 230, respectively, due to the loss or addition of a channel(s) (transient event) in the Raman-amplified optical transmission system 100, $f_4(t)$ is the delay function associated with an adjustment of the power of the DCM pump laser 235 to alter the gain of the DCM 230, and $f_5(t)$ is a function to be calculated and utilized by the DCM pump laser controller 260 to adjust the power of the DCM pump laser 235 to alter the gain in the DCM 230 to correct for the gain changes in the outside plant fiber 210 and the DCM 230 caused by the loss or addition of a channel(s) in the Raman-amplified optical transmission system 100 while accounting for the delay function $f_4(t)$ associated with an adjustment of the power of the DCM pump laser 235 to alter the gain of the DCM 230. Solving for $f_5(t)$:

$$f_5(t) = \frac{1}{g_{1i} + \Delta g_{2OP}} - g_{2i} - \Delta g_{2DCM} - f_4(t). \quad (10)$$

Again, the function $f_5(t)$ is calculated and utilized by the DCM pump laser controller 260 to adjust the pump power of the DCM pump laser 235 to alter the gain in the DCM 230 to correct for the gain changes in the outside plant fiber 210 and the DCM 230 caused by the loss or addition of a channel(s) in the Raman-amplified optical transmission system 100 while accounting for the delay function $f_4(t)$ associated with an adjustment of the power of the DCM pump laser 235 to alter the gain of the DCM 230.

Figure 5:
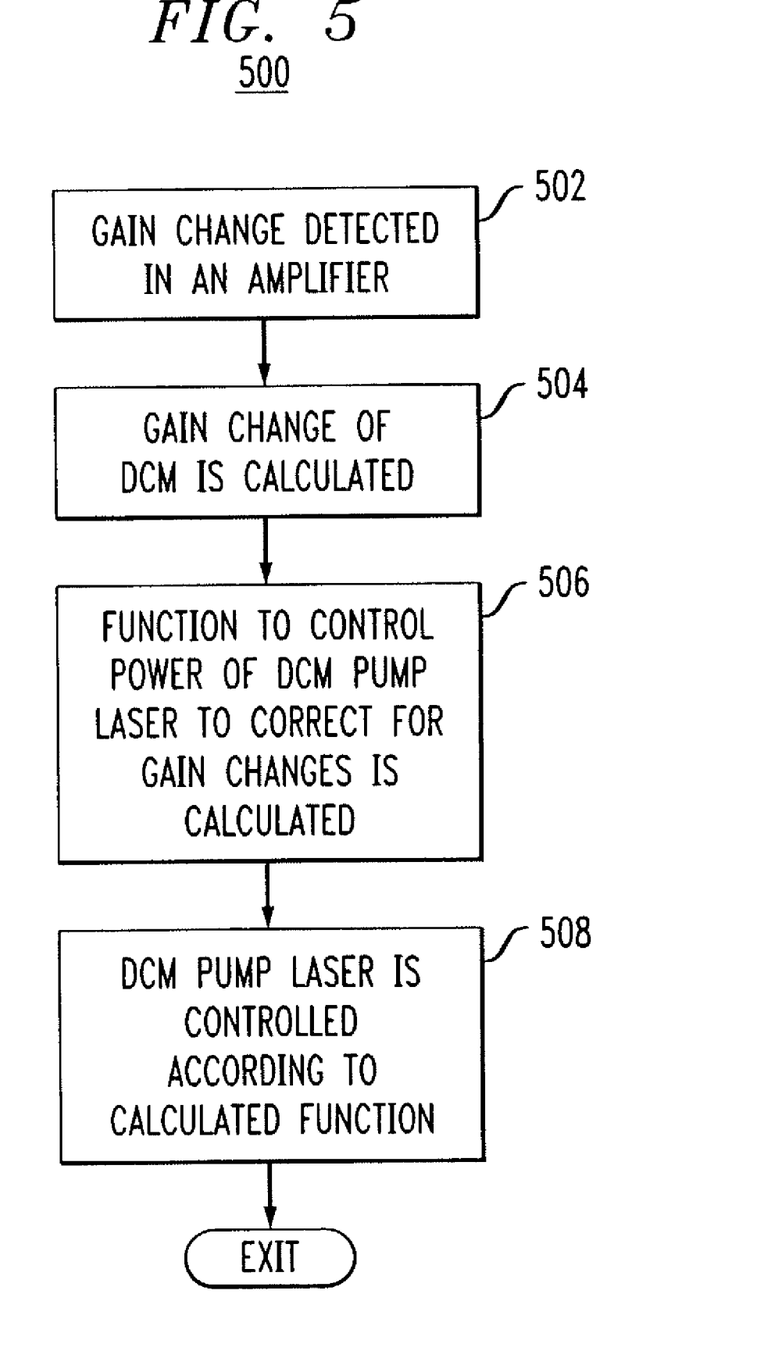
FIG. 5 depicts a flow diagram of an embodiment of a method of the present invention.

FIG. 5 depicts a flow diagram of an embodiment of a method 500 of the present invention. The method 500 is entered at step 502 when a gain change is detected in an amplifier of an amplification span of a Raman-amplified optical transmission system. For example, the power of a propagating signal in an amplification span is measured after an outside plant fiber by a monitor. Information of the measured signal powers of the propagating signal is communicated to a DCM pump laser controller. The DCM pump laser controller calculates the gain in the outside plant fiber and compares the calculated gain to a stored expected gain for the outside plant fiber to determine a gain change in the outside plant fiber. The method 500 then proceeds to step 504.

At step 504, the method 500 calculates a gain change in a DCM. For example, the gain change in the DCM 230 can be estimated by measuring the power of the propagating signal entering the DCM 130 (i.e., via the tap 240$_2$) and comparing the power of the measured propagating signal to an expected power for an input signal to the DCM 230 stored in the DCM pump laser controller 260. The method 500 then proceeds to step 506.

At step 506, the method 500 calculates a function to control the pump power of a DCM pump laser to compensate for the detected gain changes of step 502 and step 504. For example, the DCM pump laser controller may use the measured signal power information to calculate the appropriate pump power for the DCM pump laser as described in connection with equations 1–10. The DCM pump laser controller may use feed-forward control techniques, feedback control techniques, hybrid control techniques, or any other suitable control techniques to calculate the pump power for the DCM pump laser.

At step 508, the method 500 controls the DCM pump according to the function calculated at step 506. For example, the DCM pump laser controller adjusts the power of the DCM pump laser to the values calculated in step 506. The method 500 is then exited.

Figure 6:
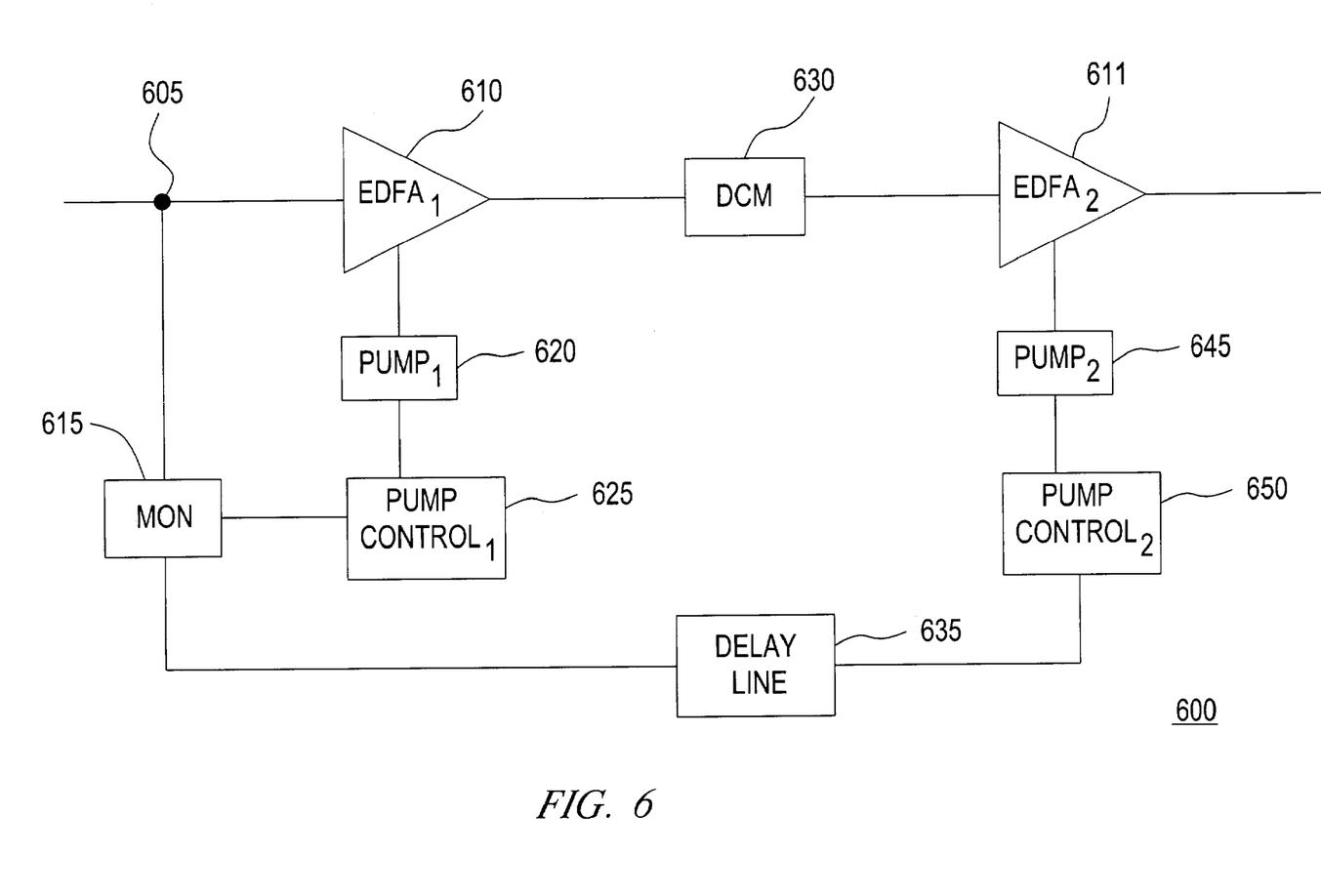
FIG. 6 depicts a high level block diagram of an amplifier span including an alternate embodiment of the present invention.

FIG. 6 depicts a high level block diagram of an amplifier span including an alternate embodiment of the present invention. The amplifier span 600 of FIG. 6 comprises a tap 605, a two-stage amplifier (illustratively, a two-stage erbium doped fiber amplifier (EDFA)) comprising a first stage 610 and a second stage 611, a monitor 615, a first stage pump 620, a first stage pump controller 625, a dispersion compensating module (DCM) 630, a delay device (illustratively a delay line) 635, a second stage pump 645, and a second stage pump controller 650. Although in the amplifier span 600 of FIG. 6 the tap 605 is depicted as being located at the beginning of the amplifier span 600, the tap 605 may be located at the end of a directly previous amplifier span in accordance with the present invention.

A signal entering the amplifier span 600 is tapped by the tap 605. The signal from the tap 605 is communicated to the monitor 615, wherein the power of the signal is measured. The power measurement of the signal measured by the monitor 615 is then fed-forward to and recorded in the first stage pump controller 625 and the second stage pump controller 650. The first stage pump controller 625 and the second stage pump controller 650 determine if there a transient event has occurred. That is, the power of the signal measured by the monitor 615 is compared to an expected power for an input signal to the amplifier span 600 stored in the pump controllers 625, 650 to determine if there has been a loss or addition of a channel(s) in the signal entering the amplifier span 600. Alternatively to determine if there has been a loss or addition of a channel(s) in the signal entering the amplifier span 600, the measured power of the input signal to the amplifier span 600 is used by the pump controllers 625, 650 to estimate a gain that a signal would experience in the first stage 610 of the EDFA. The estimated gain is then compared to an expected gain for the first stage 610 stored within the pump controllers 625, 650 to determine a change in the gain for the first stage 610 (if any) caused by a transient event, such as a loss or addition of a channel(s) in the signal entering the amplifier span 600. Although in the embodiment of the present invention of FIG. 6, both of the pump controllers 625, 650 are depicted as determining if a transient event has occurred, in an alternate embodiment of the present invention, either one of the pump controllers 625 or 650 may determine if a transient event has occurred and the determining pump controller shares the result with the other pump controller.

If it is determined by the first stage pump controller 625 that a transient event has occurred, the first stage pump controller 625 generates a control signal to adjust the first stage pump 620 to vary the gain in the first stage 610 to compensate for a gain change in the first stage 610 caused by the transient event, such as a loss or addition of a channel(s).

There is though, as in the above embodiments, a delay time associated with changing the gain of the first stage 610 of the EDFA to compensate for the gain change caused by, for example, a loss or addition of a channel(s). Although EDFAs are relatively short, the physics of an EDFA can cause relatively long response times. In the case of a large drop in the number of channels, the EDFA may be in a highly inverted state when the channels are lost. Because an EDFA pump only inject photons into the EDFA, the inverted state may slowly decay so that the output remains high for a relatively long time (~500 microseconds).

Figure 7:
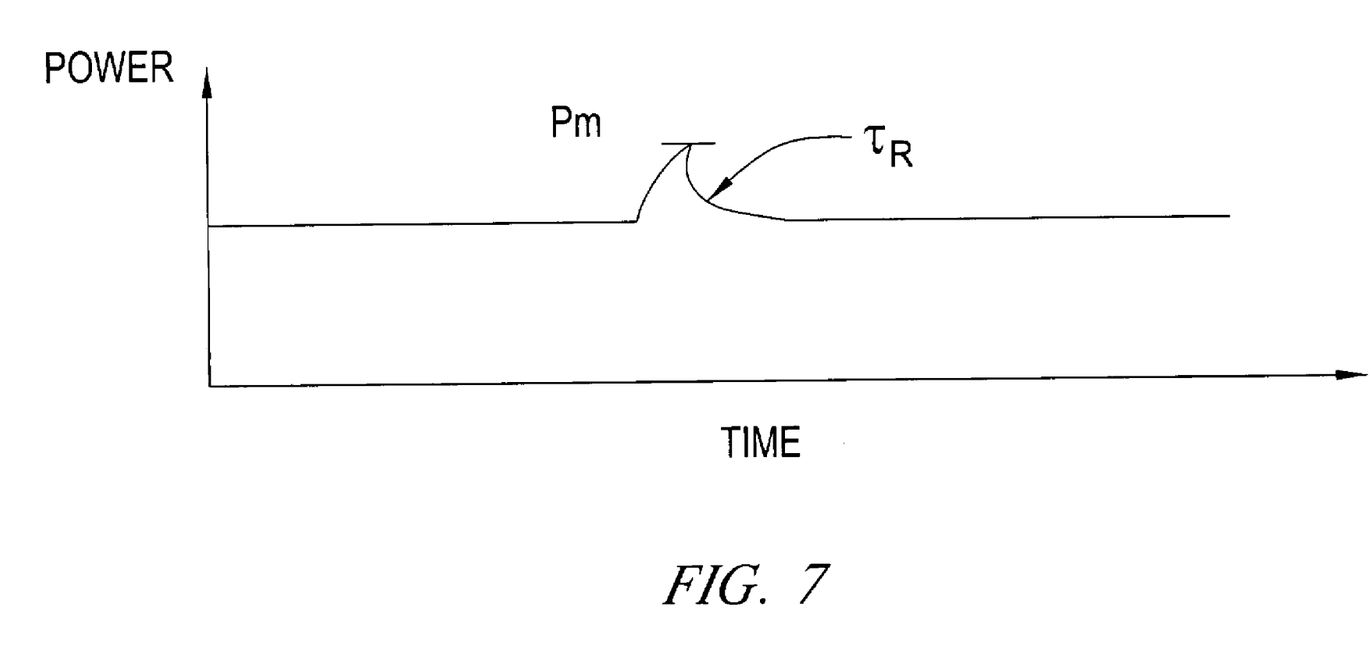
FIG. 7 graphically depicts an exemplary function of a time delay associated with a gain change in a first EDFA resulting from the adjustment of the power of the first EDFA pump.

FIG. 7 graphically depicts an exemplary function of a time delay associated with a gain change in the first stage 610 resulting from the adjustment of the power of the first stage pump 620. In FIG. 7, $\tau_R$ depicts the lifetime of the excited state of the first stage 610. $P_M$ depicts the power of the propagating optical signal in the first stage 610 right after the gain adjustment.

Referring back to the amplifier span 600 of FIG. 6, the optical signal from the first stage 610 is propagated through the DCM 630. The DCM 630 is used to delay the signal from the first stage 610 before reaching the second stage 611. That is, by using the delay of the DCM 630, the power of the second stage pump 645 may be adjusted before the signal reaches the second stage 611.

More specifically, the portion of the incoming optical signal to the amplifier span 600 tapped by the tap 605 and fed forward to the second stage pump controller 650 is propagated through the delay line 635. The second stage pump controller 650, upon determining that a transient event has occurred, generates a control signal to adjust the second stage pump 645 to adjust the gain of the second stage 611 to compensate for the time delay in the gain response of the first EDFA 610 associated with the gain of the first stage 610 being adjusted to compensate for a gain change in the first stage 610 caused by the transient event, such as a loss or addition of a channel(s). The combination of the delay of the DCM 630 and the delay line 635 are configured such that the power of the second stage pump 645 may be adjusted before the signal reaches the second stage 611. The delay of the delay line 635 typically needs to be less than the delay of the DCM 630.

For example, in the case of a large drop in the number of channels, the EDFA may be in a highly inverted state when the channels are lost. As such the gain of the second stage 611 may be adjusted by adjusting the second stage pump 645 before the signal reaches the second stage 611 so that the higher level signal quickly depletes the inversion. The net effect is that each surviving channel sees its power first have a small dip followed by a small peak instead of a large peak. Having the small peak and dip causes fewer errors than the large peak as depicted in FIG. 7.

Figure 8:
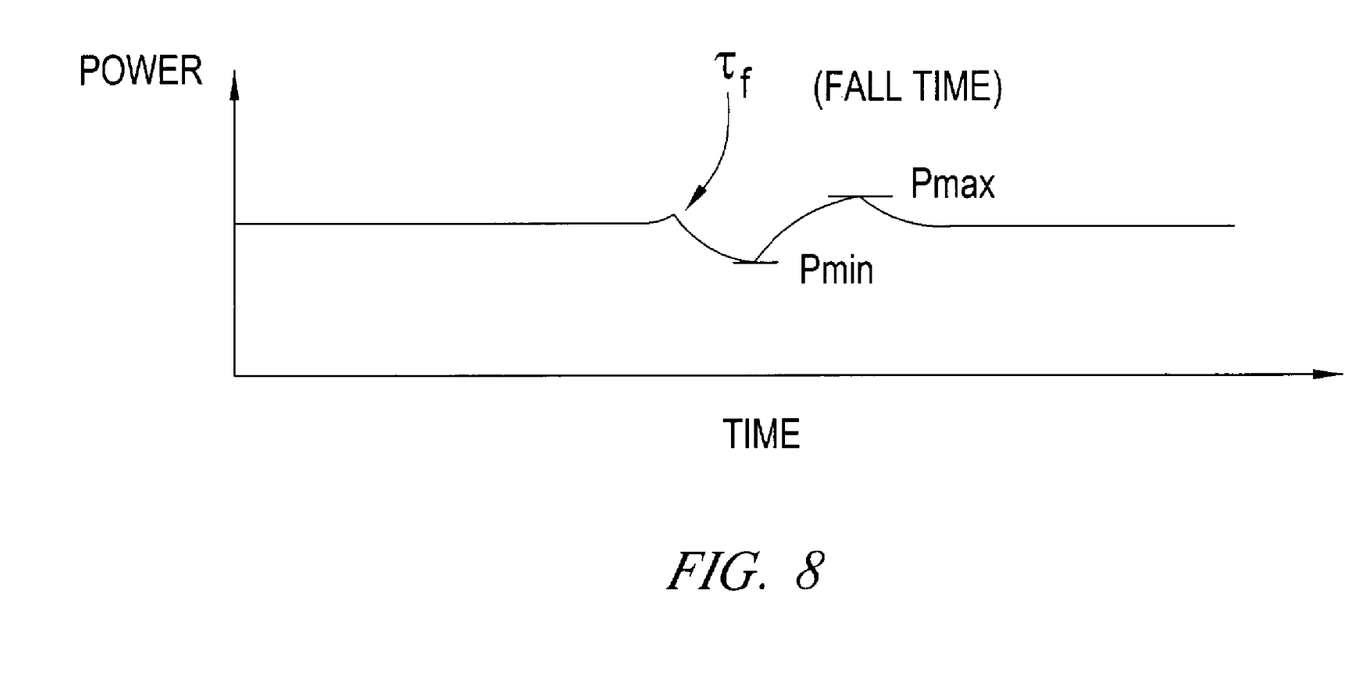
FIG. 8 graphically depicts an exemplary output of a second EDFA of the amplifier span of FIG. 6.

FIG. 8 graphically depicts an exemplary output of the second stage 611 after the gain of the second stage 611 was adjusted to compensate for a time delay in the gain response of the first stage 610 as a result of the gain of the first stage 610 being adjusted to compensate for a gain change in the first stage 610 caused by a loss or addition of a channel(s). FIG. 8 depicts the power of the optical signal output from the second stage 611 as a function of time. As depicted in FIG. 8 and mentioned previously, for the case of a drop of channels each surviving channel sees its power first have a small dip followed by a small peak instead of a large peak.

The maximum power of the output signal of the second stage 611 is lower (has a smaller peak) than that of the output of the first stage 610 (depicted in FIG. 7). The output of the second stage 611, having the small peak and dip, causes fewer errors than the large peak of the output of the first stage 610.

Although in the amplifier span 600 of FIG. 6 the amplifier is depicted as comprising a two-stage amplifier for ease of understanding, in an alternate embodiment of the present invention the two-stage EDFA of FIG. 6 may be replaced by a single amplifier. In such an embodiment the signal tapped by the tap 605 is fed forward to a single pump controller. The single pump controller generates a control signal to adjust a pump of the amplifier to correct for a change in the gain in the amplifier due to a transient event, such as a loss or addition of a channel(s). The single pump controller also takes into account the time delay in the gain response, associated with changing the gain of the amplifier to correct for the transient event, when generating the control signal to adjust the pump of the amplifier. As described above, because the signal from the tap 605 is fed-forward to the pump controller, the pump controller can adjust for the time delay and for a change in the gain in the amplifier due to a transient event in the amplifier, itself.

Although various embodiments of the present invention comprising specific components are presented above, it should be understood that the concepts of the present invention are directed, at least in part, to controlling the negative effects of power transients in amplified optical transmission systems and, as such, the embodiments of the present invention should not be limited to those embodiments comprising the components illustrated above.

For example, within the concepts of the present invention, a time delay in the gain response of an amplifier, associated with, for example, a change in the gain of the amplifier to correct for the negative effects of a transient event, may be compensated for by feeding forward a signal to a controller indicating the occurrence of the transient event. The controller then determines and generates a control signal to adjust the gain of the amplifier before an optical signal reaches the amplifier, to compensate for the time delay in the gain response.

As illustrated above, in one embodiment of the present invention, a time delay in the response of an amplifier is corrected, as taught above, within the same amplifier that experiences the time delay. Alternatively, a gain change due to a transient event is also corrected for within the same amplifier.

In another embodiment of the present invention, a time delay in the response of an amplifier is corrected, as taught above, within a subsequent amplifier. This subsequent amplifier also corrects for its own time delay, if any, and for any gain change it experiences due to a transient event, such as a loss or addition of a channel(s).

In an alternate embodiment of the present invention, a time delay in the response of an amplifier is corrected, as taught above, within a subsequent amplifier. This subsequent amplifier also corrects for a gain change in the first amplifier due to a transient event, its own time delay, if any, and for any gain change it experiences due to the transient event, such as a loss or addition of a channel(s).

As disclosed above, the correcting second amplifier, if any, may be an amplifier similar to the first amplifier experiencing the time delay or may be an entirely different type of amplifier. The concepts of the present invention are directed, at least in part, to ensuring that a gain of an amplifier span remains at a desirable gain level (i.e., a constant gain level per channel). That is, the invention is directed, at least in part, to ensuring that the gain experienced by surviving channels in an amplifier span are not affected by a transient event, such as, a loss or addition of a channel(s) within the system.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
   in response to the detection of a power transient in an optical signal in an amplified optical transmission system, varying a gain of at least one amplifier by using an inter-dependent delay function to correct for a time delay in a gain response associated with a gain change of an amplifier of said optical transmission system; and
   wherein said inter-dependent delay function further comprises at least two delay functions that describe delay characteristics of at least two different amplifier components.

2. The method of claim 1, further comprising:
   in response to the detection of the power transient, adjusting the gain of at least one amplifier to correct for a change in signal power in said optical transmission system.

3. The method of claim 2, wherein said gain change associated with the time delay is caused by the adjusting of the gain of said at least one amplifier to correct for a change in signal power due to the power transient, and as such, the gain of at least one amplifier is varied to correct for the time delay in the gain response of the adjusted at least one amplifier.

4. The method of claim 2, wherein the change in signal power due to a power transient and the time delay in the gain response of at least one amplifier are corrected by varying the gain of a single amplifier.

5. The method of claim 1, wherein the gain of said at least one amplifier is varied by varying the power of at least one corresponding amplifier pump.

6. The method of claim 5, wherein the power of said at least one corresponding amplifier pump is varied by a corresponding amplifier pump controller.

7. The method of claim 6, wherein information regarding the power transient is fed forward to said amplifier pump controller for varying the gain of said at least one amplifier.

8. The method of claim 1, wherein said power transient is indicative of a transient event.

9. The method of claim 1, wherein said at least one amplifier comprises at least one doped fiber amplifier.

10. The method of claim 9, wherein said at least one doped fiber amplifier comprises a two-stage erbium-doped fiber amplifier (EDFA).

11. The method of claim 10, wherein in response to the detection of the power transient, a gain of a first stage of said two-stage EDFA is adjusted to correct for a change in signal power in said optical transmission system and wherein a gain of a second stage of said two-stage EDFA is varied to correct for a time delay in a gain response associated with the gain change of said first stage.

12. The method of claim 11, further comprising:
   delaying an optical signal between said first stage and said second stage of said EDFA such that the gain of said second stage is varied prior to said optical signal reaching said second stage.

13. The method of claim 12, wherein the optical signal is delayed by propagating the optical signal through a dispersion compensating module.

14. The method of claim 1, wherein said amplified optical transmission system comprises a plurality of optical spans, each optical span comprising at least one amplifier, and wherein in response to the detection of a power transient in an optical span, a gain of at least one amplifier in said optical span is varied to correct for a time delay in a gain response associated wit a gain change in said optical span.

15. The method of claim 1, wherein said detection of a power transient comprises;
measuring the power level of said optical signal; and
comparing the measured power level to a stored expected power level for said optical signal.

16. The method of claim 15, wherein the expected power level for said optical signal is stored in a pump controller.

17. An apparatus comprising a memory for storing program instructions and a processor for executing said instructions, said apparatus adapted to:
in response to the detection of a power transient in an optical signal in an amplified optical transmission system, vary a gain of at least one amplifier by using an inter-dependent delay function to correct for a time delay in a gain response associated with a gain change in an amplifier; and
wherein said inter-dependent delay function further comprises at least two delay functions that describe delay characteristics of at least two different amplifier components.

18. The apparatus of claim 17, further adapted to:
in response to the detection of the power transient, adjusting the gain of at least one amplifier to correct for a change in signal power.

19. An apparatus, comprising:
a means for detecting a power transient in an optical signal in an amplified optical transmission system, wherein the power transient is indicative of a change in signal power corresponding to a transient event; and
a means for varying the gain of at least one amplifier in said amplified optical transmission system by using an inter-dependent delay function to correct for a time delay in a gain response associated with a gain change in an amplifier; and
wherein said inter-dependent delay function further comprises at least two delay functions that describe delay characteristics of at least two different amplifier components.

20. An amplified optical transmission system, comprising:
at least one amplifier, for amplifying a propagating optical signal;
at least one corresponding pump for pumping said at least one amplifier;
at least one optical tap, for tapping a portion of said propagating optical signal for measuring the optical properties;
at least one monitor, for measuring the optical properties of said portion of said propagating optical signal from said tap; and
at least one pump controller for adjusting the power to said pump, said pump controller comprising a memory for storing said measured optical properties, program instructions, and a processor for executing said instructions to configure the pump controller to perform the step of:
in response to the detection of a power transient in an optical signal in said amplified optical transmission system, vary a gain of said at least one amplifier by using an inter-dependent delay function to correct for a time delay in a gain response associated with a gain change in an amplifier of said amplified optical transmission system; and
wherein said inter-dependent delay function further comprises at least two delay functions that describe delay characteristics of at least two different amplifier components.

21. The amplified optical transmission system of claim 20, wherein said at least one amplifier comprises at least one doped fiber amplifier.

22. The amplified optical transmission system of claim 21, wherein said at least one doped fiber amplifier comprises an erbium-doped fiber amplifier (EDFA).

23. The method of claim 1 wherein said inter-dependent delay function is defined as f3(t), said at least two delay functions that describe delay characteristics of at least two different amplifier components arc defined as f1(t) and f2(t) respectively and $$f3(t) = \frac{1}{g1i + f1(t)} - g2i - \Delta g2DCM - f2(t)$$

where g1i is the gain of an outside plant fiber of the amplifier,
g2i is the gain of a dispersion compensation modnie (DCM) of the amplifier, and
Δg2DCM is the gain change of the DCM due to the loss or addition of channels in said optical transmission system.

24. The method of claim 17 wherein said inter-dependent delay function is defined as f3(t), said at least two delay functions that describe delay characteristics of at least two different amplifier components are defined as f1(t) and f2(t) respectively and $$f3(t) = \frac{1}{g1i + f1(t)} - g2i - \Delta g2DCM - f2(t)$$

where g1i is the gain of an outside plant fiber of the amplifier,
g2i is the gain of a dispersion compensation module (DCM) of the amplifier, and
Δg2DCM is the gain change of the DCM due to the loss or addition of channels in said optical transmission system.

25. The apparatus of claim 19 wherein said inter-dependent delay function is defined as f3(t), said at least two delay functions that describe delay characteristics of at least two different amplifier components are defined as f1(t) and f2(t) respectively and $$f3(t) = \frac{1}{g1i + f1(t)} - g2i - \Delta g2DCM - f2(t)$$

where g1i is the gain of an outside plant fiber of the amplifier, g2i is the gain of a dispersion compensation module (DCM) of the amplifier, and Δg2DCM is the gain change of the DCM due to the loss or addition of channels in said optical transmission system.

26. The amplified optical transmission system of claim 20 wherein said inter-dependent delay function is defined as f3(t), said at least two delay functions that describe delay characteristics of at least two different amplifier components are defined as f1(t) and f2(t) respectively and $$f3(t) = \frac{1}{g1i + f1(t)} - g2i - \Delta g2DCM - f2(t)$$

where g1i is the gain of an outside plant fiber of the amplifier, g2i is the gain of a dispersion compensation module (DCM) of the amplifier, and Δg2DCM is the gain change of the DCM due to the loss or addition of channels in said optical transmission system.

* * * * *